United States Patent
Goto et al.

(10) Patent No.: US 8,681,341 B2
(45) Date of Patent: Mar. 25, 2014

(54) SHAPE MEASURING METHOD AND SHAPE MEASURING APPARATUS

(75) Inventors: Tomonori Goto, Sapporo (JP); Jyota Miyakura, Kawasaki (JP); Hidemitsu Asano, Kawasaki (JP); Takeshi Saeki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 249 days.

(21) Appl. No.: 13/208,692

(22) Filed: Aug. 12, 2011

(65) Prior Publication Data
US 2012/0044503 A1   Feb. 23, 2012

(30) Foreign Application Priority Data
Aug. 17, 2010   (JP) ................... 2010-182085

(51) Int. Cl.
*G01B 11/02*   (2006.01)
(52) U.S. Cl.
USPC ......................................... 356/511
(58) Field of Classification Search
USPC ............... 356/489, 495, 512, 516, 511
See application file for complete search history.

(56) References Cited

U.S. PATENT DOCUMENTS

| | | | |
|---|---|---|---|
| 5,953,124 A * | 9/1999 | Deck | 356/497 |
| 6,501,553 B1 | 12/2002 | Ogawa et al. | |
| 7,119,907 B2 * | 10/2006 | Ge | 356/497 |
| 7,595,891 B2 * | 9/2009 | Tang | 356/511 |
| 2002/0149781 A1 | 10/2002 | Harasaki et al. | |
| 2005/0078319 A1 * | 4/2005 | De Groot | 356/497 |
| 2007/0008551 A1 * | 1/2007 | Tang | 356/516 |
| 2009/0096980 A1 * | 4/2009 | De Groot | 349/189 |
| 2009/0109444 A1 | 4/2009 | Wan | |
| 2011/0098971 A1 | 4/2011 | Goto et al. | |

FOREIGN PATENT DOCUMENTS

| | | |
|---|---|---|
| JP | 09-318329 | 12/1997 |
| WO | 2006-068217 | 6/2006 |

* cited by examiner

*Primary Examiner* — Tarifur Chowdhury
*Assistant Examiner* — Jonathan Hansen
(74) *Attorney, Agent, or Firm* — Rankin, Hill & Clark LLP (57) ABSTRACT

A shape measuring method includes guiding light emitted from a light source to an object to be measured and a reference surface, combining light reflected from the object to be measured with light reflected from the reference surface, and taking a distribution image of an interference light intensity corresponding to each measurement position of the object to be measured, while changing an optical path length difference between a first optical path length and a second optical path length over a whole scanning zone, sequentially storing distribution images of the interference light intensity in the whole scanning zone, and obtaining an interference light intensity string at each measurement position based on the stored distribution images of the interference light intensity, and obtaining a position in an optical axis direction at each measurement position of the object to be measured from a peak position of the interference light intensity string.

17 Claims, 7 Drawing Sheets

SHAPE MEASURING METHOD AND SHAPE MEASURING APPARATUS

CROSS REFERENCE TO RELATED APPLICATION(S)

This application is based upon and claims the benefit of priority from Japanese Patent Application No. 2010-182085 filed on Aug. 17, 2010, the entire contents of which are incorporated herein by reference.

TECHNICAL FIELD

The present invention relates to a shape measuring apparatus which measures the position of a measurement surface by the intensity of interference between light which is emitted from a light source having a broadband spectrum to the measurement surface, and light emitted to a reference surface.

RELATED ART

In related art, various shape measuring apparatuses which measure the three-dimensional shape of an object to be measured, in a noncontact manner by using an optical system. As a shape measuring apparatus which can perform three-dimensional measurement on a minute object to be measured such as a micromachine or an LSI, for example, a white light interferometer is known. In the white light interferometer, white light which is emitted from a white light source to an object to be measured to be reflected therefrom, and that which is emitted from the white light source to a reference surface to be reflected therefrom interfere with each other, the reference surface is moved in the optical axis direction, the position of the reference surface where the interference light intensity is largest is detected, and the height of the object to be measured in the optical axis direction is measured based on the position of the reference surface (Patent Reference 1).

Among such white light interferometers, also a shape measuring apparatus in which a weighted average of detection positions is calculated while the absolute value of the difference of fringe intensities before and after a predetermined change of the optical path length difference is used as the weight, and the value indicated by the weighted average is obtained as a peak position where the absolute value of the difference is maximum is known as an apparatus in which a calculation process is simplified (Patent Reference 2).

PRIOR ART REFERENCE

Patent Reference

[Patent Reference 1] WO/2006/068217
[Patent Reference 2] Japanese Patent No. 3,220,955

As described above, in a calculation method such as disclosed in Patent Reference 2, an intensity change due to the phase in a specific wavelength of the detection signal is observed, and the peak position is calculated based on the intensity change. In the case where this method is employed, measurement must be performed at short pitch intervals in order to follow the intensity change of the signal. In the case where measurement is performed on a measurement region having a wide dynamic range, therefore, a large number of images must be obtained, and hence there is a problem in that a long measurement time is required.

SUMMARY

Exemplary embodiments of the present invention provide a shape measuring method and apparatus in which, even in the case where measurement is performed on a measurement region having a wide dynamic range, the measurement can be rapidly performed.

A shape measuring method according to an exemplary embodiment of the invention, comprises:

a first step of guiding light emitted from a light source having a broadband spectrum to an object to be measured and a reference surface, combining light reflected from the object to be measured with light reflected from the reference surface, and taking a distribution image of an interference light intensity corresponding to each measurement position of a measurement surface of the object to be measured, the interference light intensity changing in accordance with an optical path length difference between a first optical path length from the light source to the object to be measured, and a second optical path length from the light source to the reference plate;

a second step of, while changing the optical path length difference between the first optical path length and the second optical path length over a whole scanning zone, sequentially storing distribution images of the interference light intensity of a plurality of measurement zones which are partly set in the whole scanning zone; and a third step of obtaining an interference light intensity string which indicates a change of the interference light intensity due to a change of the optical path length difference at each measurement position based on the stored distribution images of the interference light intensity of the measurement zones, obtaining a peak position of the interference light intensity string in the whole scanning zone from the interference light intensity string, and obtaining a position in an optical axis direction at each measurement position of the object to be measured from the peak position.

A shape measuring apparatus according to an exemplary embodiment of the invention, comprises:

a light source having a broadband spectrum;

an optical system configured to guide light emitted from the light source to an object to be measured and a reference surface, to combine light reflected from the object to be measured with light reflected from the reference surface, and to produce a distribution image of an interference light intensity corresponding to each measurement position of a measurement surface of the object to be measured, the interference light intensity changing in accordance with an optical path length difference between a first optical path length from the light source to the object to be measured, and a second optical path length from the light source to the reference plate;

an imaging unit configured to image the distribution image of the interference light intensity output from the optical system;

an optical path length changing unit configured to change the optical path length difference between the first optical path length and the second optical path length over a whole scanning zone;

an image storing unit configured to sequentially store distribution images of the interference light intensity of a plurality of measurement zones which are partly set in the whole scanning zone; and a calculating unit configured to obtain an interference light intensity string that indicates a change of the interference light intensity due to a change of the optical path length difference at each measurement position based on the distribution images of the interference light intensity stored in the image storing unit, obtain a peak position from the interference light intensity string, and to obtain a position in an optical axis direction at each measurement position of the object to be measured from the peak position.

According to the configuration, the imaging operation is performed only in the measurement zones which are partly set in the whole scanning zone. Therefore, the measurement time can be remarkably shortened.

In the shape measuring method and apparatus, for example, an amplitude of each measurement zone at each measurement position may be calculated from the interference light intensity string of each measurement zone at each measurement position, a curve may be applied to the calculated amplitude of each measurement zone at each measurement position, and a peak position of the curve may be obtained as the peak position of the interference light intensity string in the whole scanning zone at each measurement position.

In the shape measuring method and apparatus, a provisional peak position and a phase of a specific wavelength may be calculated from the interference light intensity string of each measurement zone at each measurement position, and the peak position may be calculated from the provisional peak position, a position of the measurement zone in the whole scanning zone, the specific wavelength and the calculated phase.

According to the configuration, the measurement accuracy which is lowered by reduction of the number of measurement points can be complemented, and accurate three-dimensional shape measurement is enabled.

In the shape measuring method and apparatus, an imaging region of the object to be measured may be divided into a plurality of small regions, a small region which is to be imaged may be switched depending on a position in a scanning direction in the whole scanning zone, and a zone in which the small region is imaged may be set as the measurement zone.

According to the configuration, data related to the plurality of small regions can be obtained as a result of one scan of the reference surface, and therefore three-dimensional shape measurement can be further speeded up.

According to the exemplary embodiments of the invention, even in the case where measurement is performed on a measurement region having a wide dynamic range, the measurement can be rapidly performed.

DETAILED DESCRIPTION

First Embodiment

Next, a shape measuring apparatus and method of a first embodiment of the invention will be described in detail.

Figure 1:
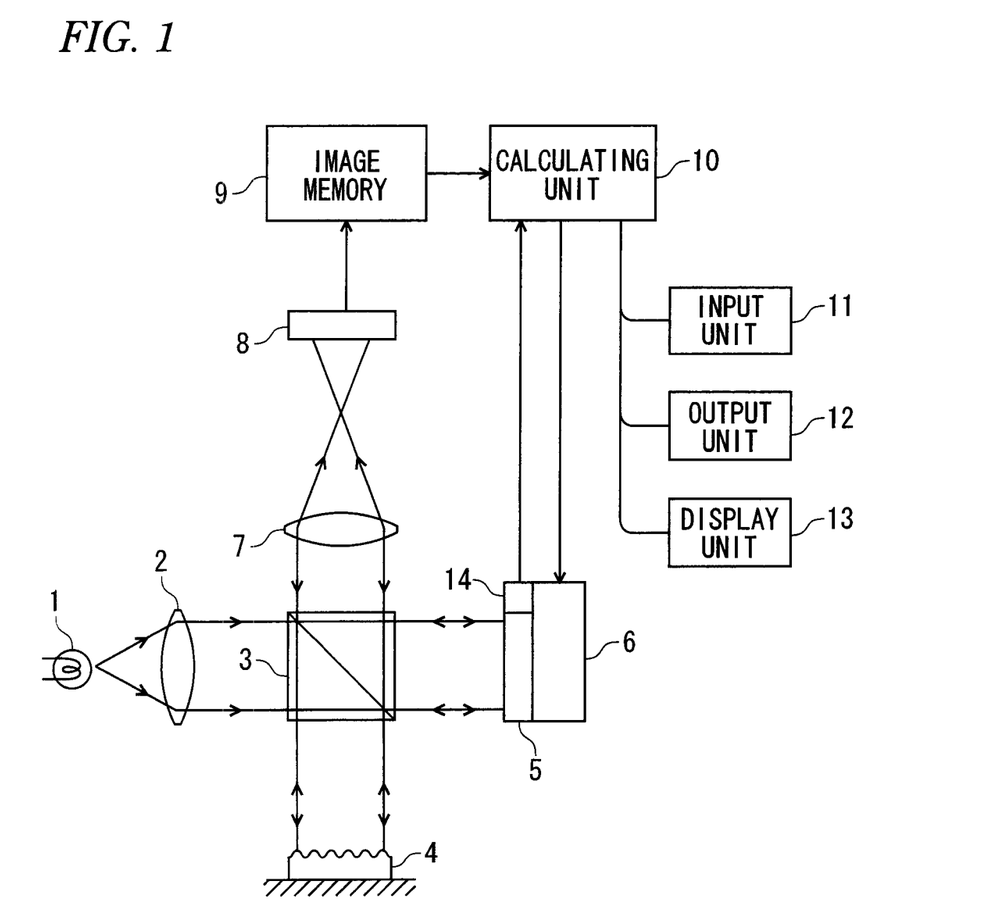
FIG. 1 is a block diagram showing the configuration of a shape measuring apparatus of a first embodiment of the invention.

FIG. 1 is a diagram showing the configuration of a white light interferometer which is the shape measuring apparatus of the embodiment. In the embodiment, a Michelson-type interferometer will be described. Alternatively, another equal path length interferometer such as a Mirau-type interferometer may be used. The interferometer may be used together with another optical measuring apparatus such as an image measuring apparatus.

A light source 1 is a white light source having a broadband spectrum, such as a halogen lamp, a xenon lamp, a mercury lamp, a metal-halide lamp, or an LED. White light emitted from the light source 1 is collimated by a collimator lens 2, and then split into two directions by a beam splitter 3. One of the split beams impinges on a measurement surface of a workpiece 4 which is an object to be measured, and the other split beam impinges on a reference surface of a reference plate 5. The white light beams which are reflected respectively from the measurement surface and the reference surface are combined with each other by the beam splitter 3, and interference light at this time is imaged by a CCD camera 8 through an imaging lens 7.

The reference plate 5 is moved and scanned in the optical axis direction by a driving unit 6 such as a piezoelectric element, and an interference image at each scanning position is sampled by the CCD camera 8, and then stored in an image memory 9. A calculating unit 10 obtains the position of the measurement surface of the workpiece 4 in the height direction based on the intensity of the interference light at each measurement position of the measurement surface of the workpiece 4, and information of the scanning position of the reference plate 5 supplied from an encoder 14. Data required for measurement are input to the calculating unit 10 through an input unit 11. An output unit 12 outputs measurement results obtained by the calculating unit 10. A display unit 13 displays information required for an input operation, and measurement results.

Next, a shape measuring method by the white light interferometer will be described.

Figure 2:
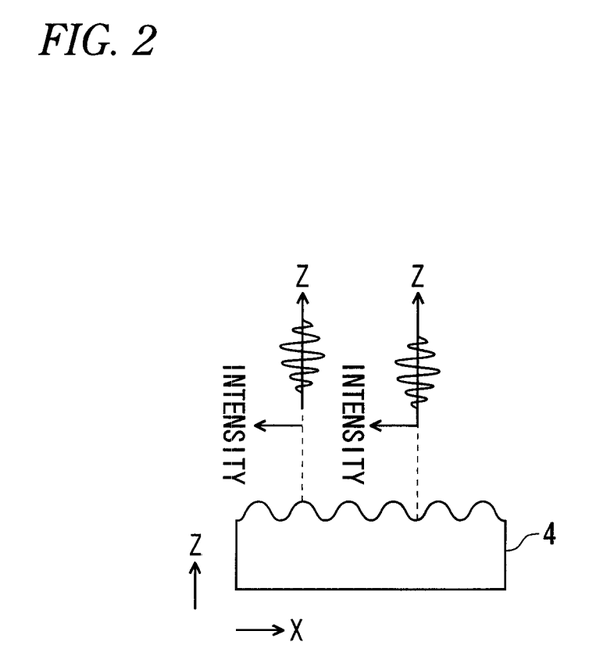
FIG. 2 is a view illustrating a shape measuring method in the apparatus.

The white light from the light source 1 is reflected from the measurement surface of the workpiece 4 and the reference surface of the reference plate 5, and combined with each other by the beam splitter 3. The interference light intensity at that time depends on the optical path length difference between a first optical path length from the light source 1 to the workpiece 4, and a second optical path length from the light source 1 to the reference plate 5. When the first and second optical path lengths are equal to each other, the interference light intensity is largest. The interference light intensity is changed by moving and scanning the reference plate 5 in the optical axis direction by the piezoelectric element 6. When low coherent white light is used, the range where an interference pattern is generated can be narrowed. According to this structure, as shown in FIG. 2, for example, a change of interference light intensity which is caused at each position of the measurement surface by the movement and scanning of the reference surface occurs at a phase corresponding to the height of the measurement surface (the Z-direction position). Therefore, the scanning position of the reference surface where the peak value of the change in the interference light intensity at each position of the measurement surface is observed (hereinafter, this scanning position is referred as peak position) can be obtained as the height of the corresponding portion of the measurement surface.

Figure 3A:
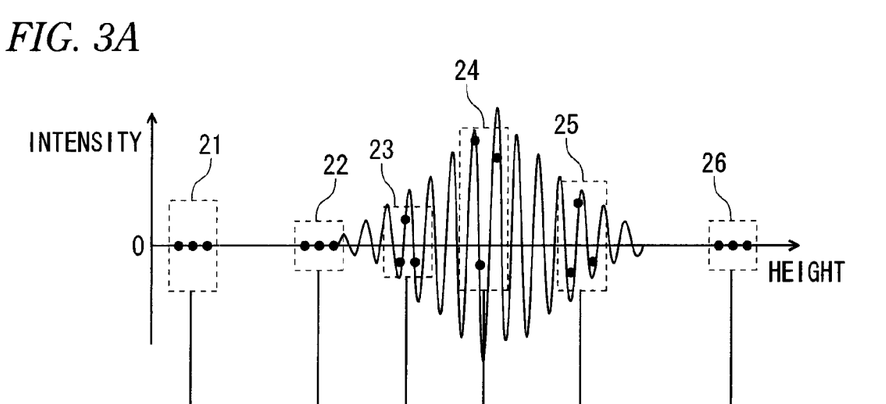
FIGS. 3A and 3B are views showing a sampling method in the apparatus.
Figure 3B:
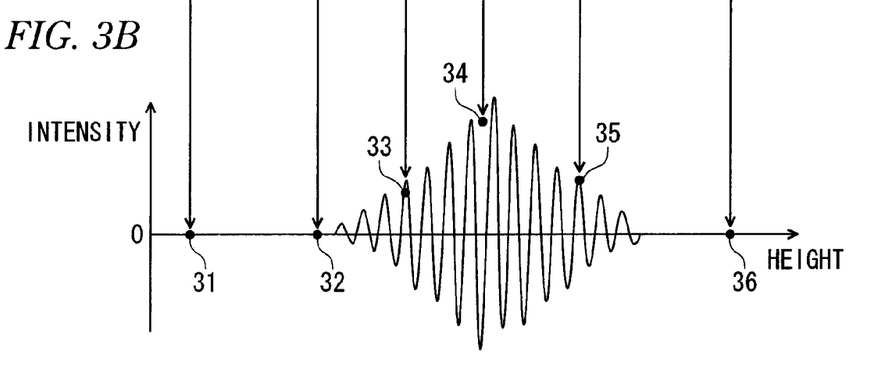

FIGS. 3A and 3B are views showing a sampling method in the shape measuring apparatus of the embodiment. In the embodiment, a plurality of measurement zones 21 to 26 are set at intervals of 50 to 200 nm pitch in the whole scanning zone of the reference plate 5, and the imaging operation is performed only when the reference plate 5 exists in the measurement zones 21 to 26. At this time, preferably, the number of points where data of the interference light intensity is obtained in one measurement zone is three or more. From results of observations in the measurement zones, next, feature amounts 31 to 36 in the measurement zones are determined. Examples of the feature amounts are the difference between the maximum and minimum values of obtained data in each measurement zone, the differential absolute sum of obtained data, or the amplitude of a specific wavelength.

Figure 4:
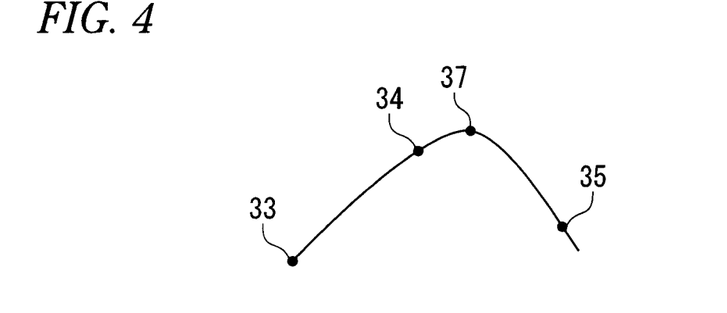
FIG. 4 is a view showing a method of detecting a peak position in the apparatus.

FIG. 4 shows a method of deciding a peak position from the feature values calculated by the above-described method. In the embodiment, a peak position 37 is detected by applying a curve to feature amounts (33, 34, 35) in the measurement zones as shown in FIG. 4 by using a method such as the secondary fitting. According to the embodiment, the imaging operation is performed in the measurement zones 21 to 26 which are partly set in the whole scanning zone, and therefore the measurement time can be remarkably shortened. Since the imaging operation is not performed in the whole scanning zone, however, an error is produced between the position where the maximum feature amount is detected, and the peak position. The thus produced error is largely suppressed by the above-described secondary fitting or the like.

In order to obtain the peak position more correctly, the following method may be employed. In the method, a sinusoidal wave of a specific wavelength is applied to a data group which is obtained in the vicinity of the peak position (for example, data which are obtained in the measurement zones 24, 25), and the peak position is accurately calculated from the phase information of the sinusoidal wave. At this time, for example, the peak position which is calculated by the above-described method (hereinafter, the position is referred to as the provisional peak position) is indicated by z, the position of the specific measurement zone in which the phase is calculated in the whole scanning zone is indicated by p, the specific wavelength is indicated by λ, the phase difference of the position p with respect to the peak position is indicated by Φ, and the following position which is closest to the provisional peak position z is obtained as the peak position. The position p of the measurement zone is a position which is used as a reference when the phase difference Φ is calculated, for example, a position in which the interference light intensity is firstly measured within the measurement zone 24 can be used as the position p. The phase difference Φ can be obtained from data group which is obtained in vicinity of the peak position, for example, from data group obtained within the measurement zone 24. In the expression, N indicates an arbitrary integer.

$$p + \left(N + \frac{\phi}{2\pi}\right) * \lambda \qquad [\text{Exp. 1}]$$

In such a method, first, a sinusoidal wave of a specific wavelength in the measurement zone is applied to the data group which is obtained in the vicinity of the peak position. A plurality of candidates of the peak position exist in measurement zone. According to the above-described method, among the plurality of candidates, the peak position is determined by setting the value of N so that the candidate becomes closest to the provisional peak position. In the method, the peak position can be strictly determined by using a reduced number of measurement points.

Figure 5:
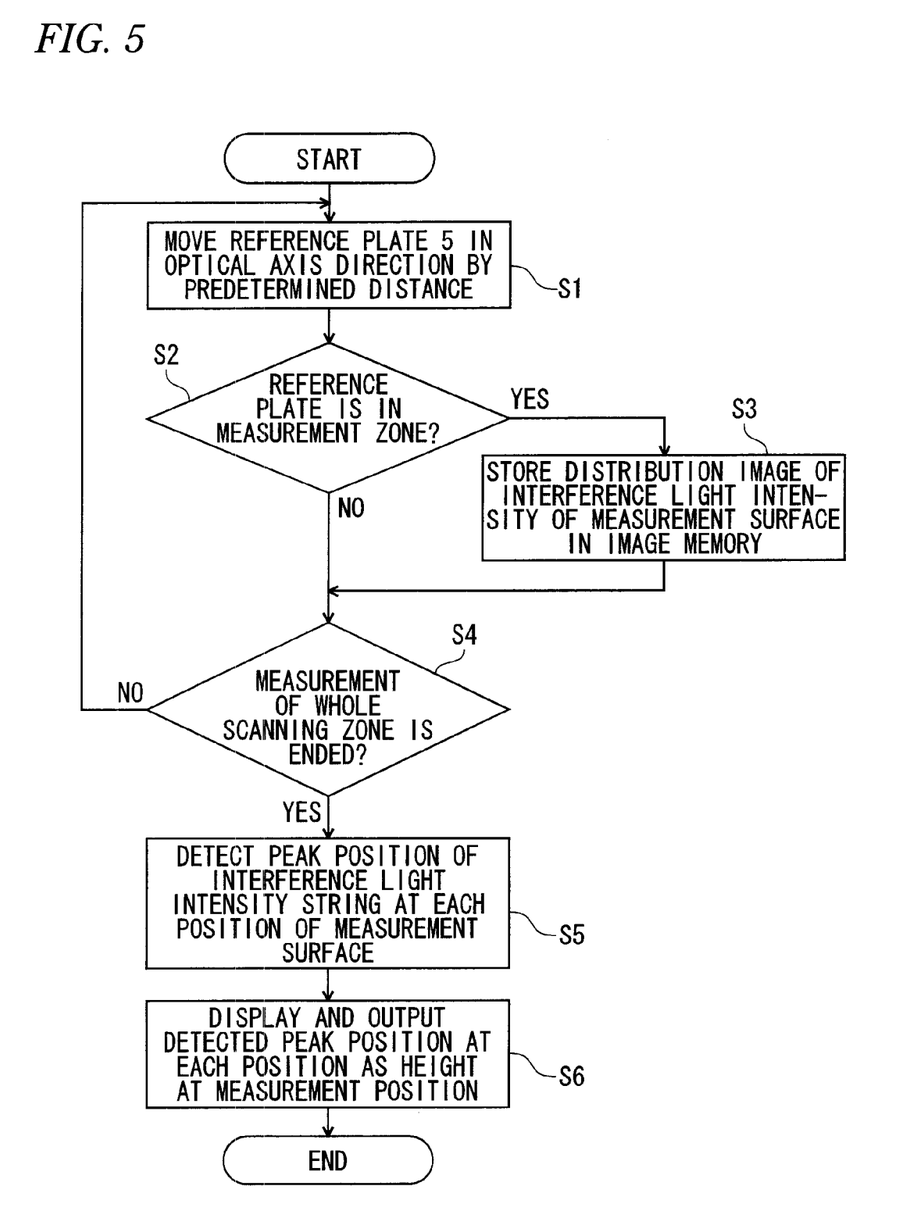
FIG. 5 is a flowchart illustrating the shape measuring method in the apparatus.

Next, the operation of the shape measuring apparatus of the embodiment will be described specifically. FIG. 5 is a flowchart illustrating the shape measuring method in the apparatus.

First, the reference plate 5 is moved in the optical axis direction by a predetermined distance (S1). Next, it is checked whether the reference plate 5 exists in any one of the measurement zones 21 to 26 or not (S2). If the reference plate 5 exists in one of the measurement zones, an image of the measurement surface is taken, and a two-dimensional distribution image of the interference light intensity is stored in the image memory 9 (S3). The above is repeated until measurement of the whole scanning zone is ended (S4). When a predetermined number of distribution images are stored in the image memory 9, the peak position of an interference light intensity string is detected at each measurement position of the measurement surface as shown in FIGS. 3 and 4 (S5). Herein, the interference light intensity string indicates a change of the interference light intensity due to a change of the optical path length difference. Then, the detected peak positions at the measurement positions are displayed and output as the heights at the measurement positions (S6).

In the shape measuring apparatus of the embodiment, the imaging operation is performed only in the measurement zones 21 to 26 which are partly set in the whole scanning zone, and hence the measurement time can be remarkably shortened. In such a technique, there is a possibility in that the measurement accuracy is sacrificed. In the shape measuring apparatus of the embodiment, however, the peak position can be accurately determined by the above-described technique which uses the secondary fitting and information of a specific wavelength. According to the shape measuring apparatus of the embodiment, therefore, rapid measurement in the Z-direction range where the dynamic range is wide, and a large shortening of the measurement time due thereto are enabled without sacrificing the measurement accuracy.

Second Embodiment

Figure 6A:
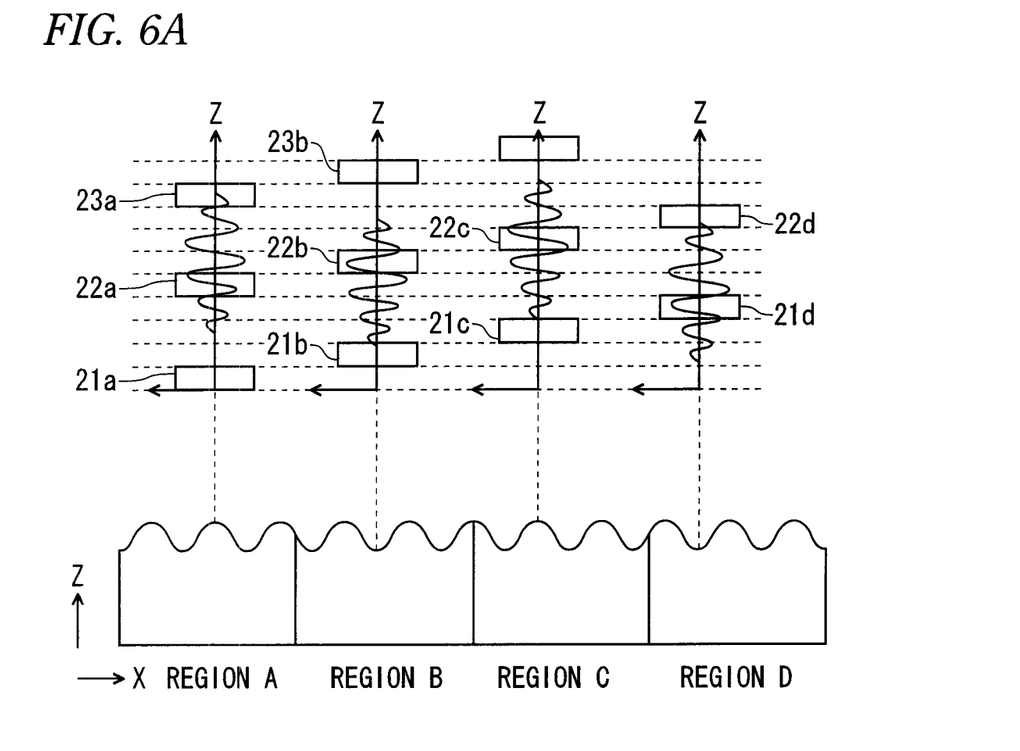
FIGS. 6A and 6B are views illustrating a shape measuring method in a shape measuring apparatus of a second embodiment of the invention.
Figure 6B:
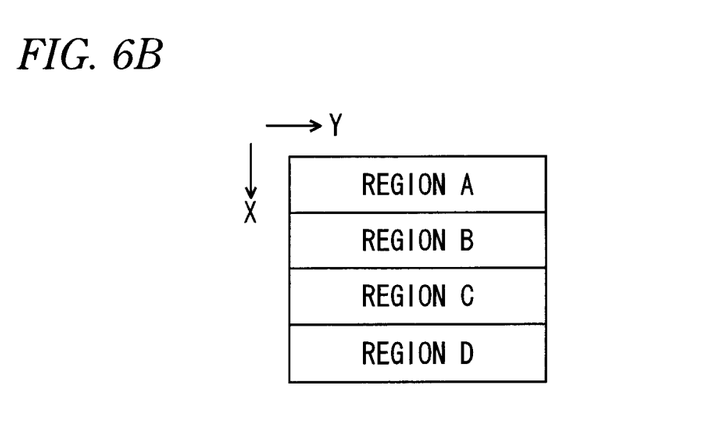

Next, a shape measuring apparatus of a second embodiment of the invention will be described. FIGS. 6A and 6B are views illustrating a shape measuring method in the apparatus. In the embodiment, an imaging region which is to be observed by the shape measuring apparatus is divided into a plurality of small regions A to D. Hereinafter, a shape observing method in the embodiment will be described. First, a measurement zone 21a in the region A is observed in a similar manner as the first embodiment. After the observation of the measurement zone 21a is ended, the small region to be observed (hereinafter, the region to be observed) is changed from the region A to the region B, and a measurement zone 21b is observed. Then, observation is performed while similarly switching over the region to be observed. When all the small regions have been observed, the region to be observed is again switched to the region A, and a measurement zone 22a is observed. Thereafter, all the measurement zones of all the small regions are similarly observed.

Figure 7:
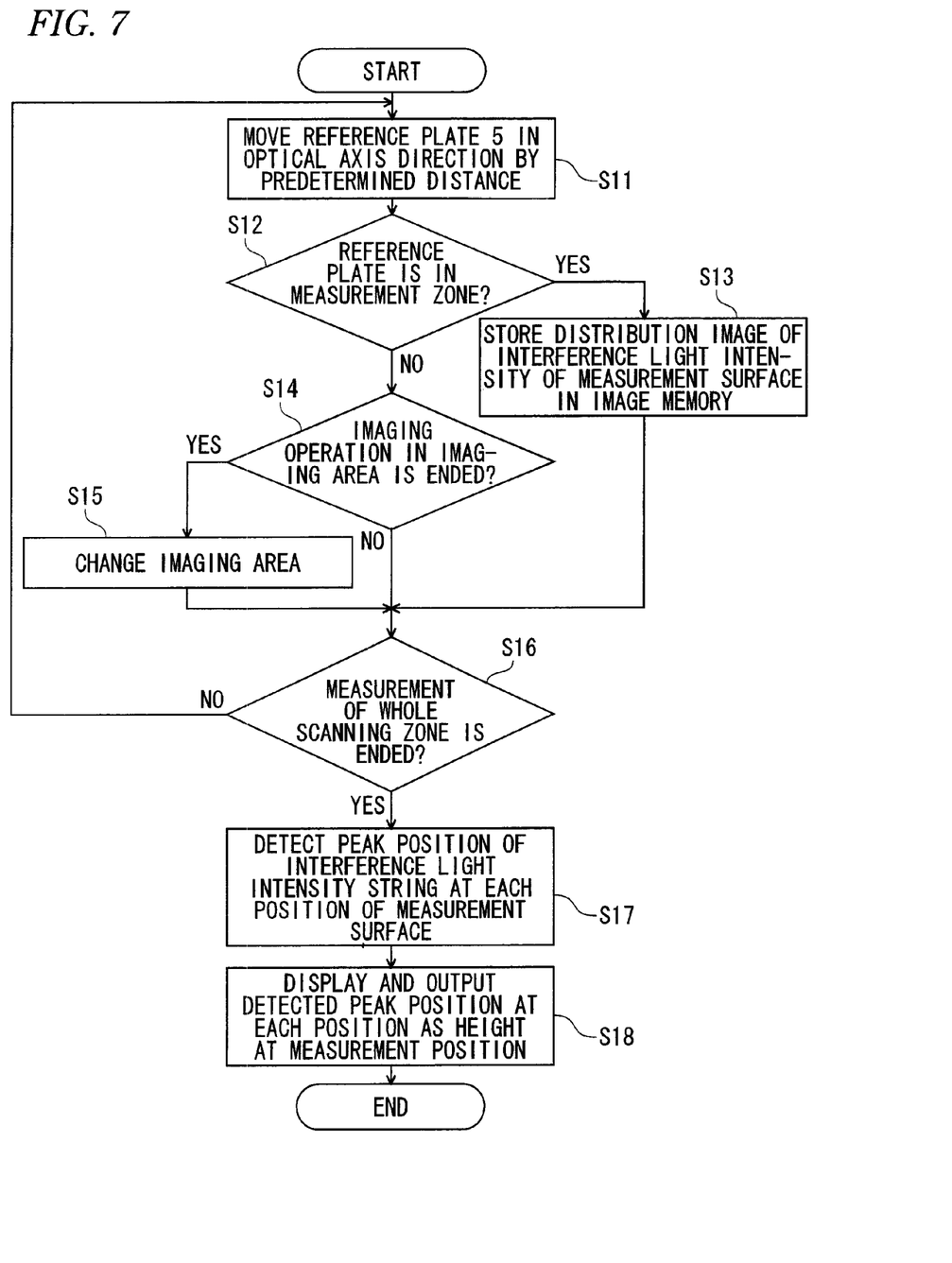
FIG. 7 is a flowchart illustrating the shape measuring method in the apparatus.

Next, the operation of the shape measuring apparatus of the embodiment will be described specifically. FIG. 7 is a flowchart illustrating the shape measuring method in the apparatus. The basic operation is identical with that of the first embodiment, but the operation is different in that the region to be observed is checked and changed.

First, the reference plate 5 is moved in the optical axis direction by a predetermined distance (S11). Next, it is checked whether the reference plate 5 exists in the measurement zones or not (S12). If the reference plate 5 exists in the measurement zones, a two-dimensional distribution image of the interference light intensity of the measurement surface is stored in the image memory 9 (S13). If the reference plate 5 does not exist in the measurement zones, it is checked whether the imaging operation in the region to be observed is ended or not (S14). If ended, the region to be observed is switched to another one (S15). When the observation of the observation region D is ended, the region to be observed is returned to the observation region A. The above is repeated until measurement of all the measurement zones of all the small regions is ended (S16). When a predetermined number of distribution images are stored in the image memory 9, the peak position of an interference light intensity string is detected at each measurement position of the measurement surface (S17). Herein, the interference light intensity string indicates a change of the interference light intensity due to a change of the optical path length difference. Then, the detected peak positions at the measurement positions are displayed and output as the heights at the measurement positions (S18).

In the shape measuring apparatus of the embodiment, when a CMOS camera or the like is used as an image pickup device, the imaging region is narrowed, so that an image can be obtained at a speed which is higher by several times than a usual frame rate. When the imaging region of a CCD camera is divided into, for example, four sub-regions as shown in FIG. 6B, therefore, the frame rate can be speeded up four times by taking advantage of the characteristics. More specifically, in the case where a height range of 40 μm is measured with a pitch of 100 nm by using a camera with a frame rate of 60 frame/sec., the substantial frame rate is 60×4=240 frame/sec., and the imaging time can be shortened from 40,000/100/60=6.7 sec. to 1.7 sec.

The invention is not limited to the above-described embodiments. For example, the second embodiment may be more generalized, so that the position of the measurement zone in the whole scanning zone is made different depending on the measurement position of the measurement surface. According to the configuration, measurement zones can be distributed, and measurement with reduced error is enabled.

What is claimed is:

1. A shape measuring method comprising:
    a first step of guiding light emitted from a light source having a broadband spectrum to an object to be measured and a reference surface, combining light reflected from the object to be measured with light reflected from the reference surface, and taking a distribution image of an interference light intensity corresponding to each measurement position of a measurement surface of the object to be measured, the interference light intensity changing in accordance with an optical path length difference between a first optical path length from the light source to the object to be measured, and a second optical path length from the light source to the reference plate;
    a second step of, while changing the optical path length difference between the first optical path length and the second optical path length over a whole scanning zone, sequentially storing distribution images of the interference light intensity of only a plurality of measurement zones which are partly set in the whole scanning zone; and
    a third step of obtaining an interference light intensity string which indicates a change of the interference light intensity due to a change of the optical path length difference at each measurement position based on the stored distribution images of the interference light intensity of the measurement zones, obtaining a peak position of the interference light intensity string in the whole scanning zone from the interference light intensity string, and obtaining a position in an optical axis direction at each measurement position of the object to be measured from the peak position.

2. The shape measuring method according to claim 1, wherein, in the third step, an amplitude of each measurement zone at each measurement position is calculated from the interference light intensity string of each measurement zone at each measurement position, a curve is applied to the calculated amplitude of each measurement zone at each measurement position, and a peak position of the curve is obtained as the peak position of the interference light intensity string in the whole scanning zone at each measurement position.

3. The shape measuring method according to claim 1, wherein,
    in the third step, a provisional peak position and a phase of a specific wavelength are calculated from the interference light intensity string of each measurement zone at each measurement position, and
    the peak position is calculated from the provisional peak position, a position of the measurement zone in the whole scanning zone, the specific wavelength and the calculated phase.

4. The shape measuring method according to claim 1, wherein the position of the measurement zone in the whole scanning zone is made different depending on the measurement position.

5. The shape measuring method according to claim 1, wherein
    an imaging region of the object to be measured is divided into a plurality of small regions,
    in the first step, a small region which is to be imaged is switched depending on a position in a scanning direction in the whole scanning zone, and,
    in the second step, a zone in which the small region is imaged in the first step is set as the measurement zone.

6. A shape measuring apparatus comprising:
    a light source having a broadband spectrum;
    an optical system configured to guide light emitted from the light source to an object to be measured and a reference surface, to combine light reflected from the object to be measured with light reflected from the reference surface, and to produce a distribution image of an interference light intensity corresponding to each measurement position of a measurement surface of the object to be measured, the interference light intensity changing in accordance with an optical path length difference between a first optical path length from the light source to the object to be measured, and a second optical path length from the light source to the reference plate;
    an imaging unit configured to image the distribution image of the interference light intensity output from the optical system;
    an optical path length changing unit configured to change the optical path length difference between the first optical path length and the second optical path length over a whole scanning zone;
    an image storing unit configured to sequentially store distribution images of the interference light intensity of only a plurality of measurement zones which are partly set in the whole scanning zone; and
    a calculating unit configured to obtain an interference light intensity string that indicates a change of the interference light intensity due to a change of the optical path length difference at each measurement position based on the distribution images of the interference light intensity stored in the image storing unit, obtain a peak position from the interference light intensity string, and to obtain a position in an optical axis direction at each measurement position of the object to be measured from the peak position.

7. The shape measuring apparatus according to claim 6, wherein
the calculating unit is configured to calculate an amplitude of each measurement zone at each measurement position from the interference light intensity string of each measurement zone at each measurement position, to apply a curve to the calculated amplitude of each measurement zone at each measurement position, and to obtain a peak position of the curve as the peak position of the interference light intensity string in the whole scanning zone at each measurement position.

8. The shape measuring apparatus according to claim 6, wherein
the calculating unit is configured to calculate a provisional peak position and a phase of a specific wavelength from the interference light intensity string of each measurement zone at each measurement position, and
to calculate the peak position from the provisional peak position, a position of the measurement zone in the whole scanning zone, the specific wavelength and the calculated phase.

9. The shape measuring apparatus according to claim 6, wherein
an imaging region of the object to be measured which is to be imaged by the imaging unit is divided into a plurality of small regions,
the imaging unit is configured to perform an imaging operation while switching a small region which is to be imaged, depending on a position in a scanning direction in the whole scanning zone, and
the storing unit is configured to set a zone in which the small region is imaged by the imaging unit, as the measurement zone.

10. The shape measuring method according to claim 1, wherein
the distribution image of the interference light intensity is taken at only the plurality of measurement zones which are partly set in the whole scanning zone.

11. The shape measuring method according to claim 10, wherein
distribution images of interference light intensity of the whole scanning zone are not taken; and
distribution images of interference light intensity of the whole scanning zone are not stored.

12. The shape measuring method according to claim 1, wherein
the interference light intensity string is calculated by using three or more interference light intensities at each measurement zone.

13. The shape measuring apparatus according to claim 6, wherein
the imaging unit is configured to image the distribution image of the interference light intensity output from the optical system at only the plurality of measurement zones which are partly set in the whole scanning zone.

14. The shape measuring apparatus according to claim 13, wherein
the imaging unit is not configured to image distribution images of interference light intensity output over the whole scanning zone; and
the image storing unit is not configured to store distribution images of interference light intensity of the whole scanning zone.

15. The shape measuring apparatus according to claim 6, wherein
the calculating unit is configured to use three or more interference light intensities at each measurement zone to obtain the interference light intensity string.

16. The shape measuring method according to claim 1, wherein
the sequentially storing distribution images of the interference light intensity of only the plurality of measurement zones which are partly set in the whole scanning zone comprises sequentially storing distribution images of the interference light intensity at three or more measurement positions within each of the plurality of measurement zones which are partly set in the whole scanning zone, the plurality of measurement zones being set at spaced intervals from one another.

17. The shape measuring apparatus according to claim 6, wherein
the image storing unit is configured to sequentially store distribution images of the interference light intensity at three or more measurement positions within each of the plurality of measurement zones which are partly set in the whole scanning zone, the plurality of measurement zones being set at spaced intervals from one another.

* * * * *